(12) United States Patent
Oizumi

(10) Patent No.: US 8,063,948 B2
(45) Date of Patent: Nov. 22, 2011

(54) PROXIMITY-BASED SYSTEM AND METHOD FOR REDUCING GAIN IMBALANCE IN A BAYER PATTERN AND DIGITAL CAMERA EMPLOYING THE SAME

(75) Inventor: Munenori Oizumi, Tsuchiura (JP)

(73) Assignee: Texas Instruments Incorporated, Dallas, TX (US)

( * ) Notice: Subject to any disclaimer, the term of this patent is extended or adjusted under 35 U.S.C. 154(b) by 764 days.

(21) Appl. No.: 12/037,449

(22) Filed: Feb. 26, 2008

(65) Prior Publication Data

US 2008/0204572 A1    Aug. 28, 2008

Related U.S. Application Data

(60) Provisional application No. 60/891,587, filed on Feb. 26, 2007, provisional application No. 60/895,882, filed on Mar. 20, 2007, provisional application No. 60/909,429, filed on Mar. 31, 2007.

(51) Int. Cl.
H04N 9/73 (2006.01)
H04N 3/14 (2006.01)
(52) U.S. Cl. ..................... 348/223.1; 348/273

(58) Field of Classification Search ................ None
See application file for complete search history.

(56) References Cited

U.S. PATENT DOCUMENTS

| | | | |
|---|---|---|---|
| 7,009,639 B1 * | 3/2006 | Une et al. ............ | 348/223.1 |
| 7,826,656 B2 * | 11/2010 | Chiu ..................... | 382/162 |
| 2006/0050159 A1 * | 3/2006 | Ahn ..................... | 348/272 |
| 2007/0002154 A1 * | 1/2007 | Kang et al. ........... | 348/272 |

* cited by examiner

*Primary Examiner* — Luong T Nguyen
(74) *Attorney, Agent, or Firm* — Mirna Abyad; Wade J. Brady, III; Frederick J. Telecky, Jr.

(57) ABSTRACT

A proximity-based system for, and method of, reducing Gr-Gb gain imbalance and a digital camera incorporating the system or the method. In one embodiment, the system includes: (1) a sensor configured to provide a input Bayer pattern array containing amplitudes corresponding to Gr and Gb cells and (2) a processor coupled to the sensor and configured to (2a) compute for at least some of the Gr and Gb cells: closeness measures for pluralities of adjacent, same-type cells, weights for pluralities of adjacent, opposite-type cells based on the closeness measures and weighted averages of the pluralities of the adjacent, opposite-type cells based on the weights and (2b) use the weighted averages to form an output Bayer pattern in which the Gr-Gb gain imbalance is reduced.

17 Claims, 8 Drawing Sheets

PROXIMITY-BASED SYSTEM AND METHOD FOR REDUCING GAIN IMBALANCE IN A BAYER PATTERN AND DIGITAL CAMERA EMPLOYING THE SAME

CROSS-REFERENCE TO PROVISIONAL APPLICATION

This application claims the benefit of U.S. Provisional Application Ser. No. 60/891,587, filed by Oizumi on Feb. 26, 2007, entitled "Digital Camera and Interpolation Method," commonly assigned with the invention and incorporated herein by reference. U.S. Provisional Application Ser. No. 60/895,882, filed by Sheikh on Mar. 20, 2007, entitled "Digital Camera and Interpolation Method," and U.S. Provisional Application Ser. No. 60/909,429, filed by Sheikh on Mar. 31, 2007, "Digital Camera and Interpolation Method," commonly assigned with the invention and incorporated herein by reference disclose related subject matter.

TECHNICAL FIELD OF THE INVENTION

The invention is directed, in general, to digital image processing and, more specifically, to a proximity-based system and method for reducing gain imbalance in a Bayer pattern and a digital camera employing the system or the method.

BACKGROUND OF THE INVENTION

Still imaging and video devices have become a significant part of consumer electronics. Digital cameras, digital camcorders, and video cellular phones are common, and many other new devices are being introduced into and evolving in the market continually. Advances in large resolution charge-coupled device (CCD) and complementary metal-oxide semiconductor (CMOS) image sensors, together with the availability of low-power, low-cost digital signal processors (DSPs), has led to the development of digital cameras with both high resolution (e.g., a five-megacell image sensor with a 2560×1920 cell array) still image and audio/video clip capabilities. In fact, high resolution digital cameras provide quality close to that offered by traditional 35 mm film cameras.

Digital cameras typically contain an "image pipeline" for digital camera control and image processing. Among other things, the image pipeline performs automatic focus, automatic exposure, and automatic white balancing, color filter array (CFA) interpolation, gamma correction, color space conversion, and Joint Photographic Experts Group/Motion Picture Experts Group compression/decompression (JPEG for single images and MPEG for video clips).

The typical color CCD/CMOS sensor consists of a rectangular array of photosites (cells) covered by the CFA; each cell of the CCD/CMOS sensor is covered by a color filter element of the CFA. Most CFAs employ a Bayer pattern of red, green and blue filters. As those skilled in the art understand, a Bayer pattern is a 2×2 array of color cells, a red cell, two green cells and a blue cell. For this reason, the Bayer pattern is sometimes referred to as GRGB. The two green cells are at the diagonal positions. In in the horizontal direction, each line has either "R" and "Gr" or "Gb" and "B" where Gr is a green cell in a line with red cells, and Gb is a green cell in a line with blue cells. Green cells form a checkerboard pattern, and R or B cells fill the rest of each line.

The sensor output is an image with each cell amplitude a measure of the intensity of the corresponding filter color of the cell. The CFA interpolation provides the two other color amplitudes for each cell to give the full-color image of the input scene. The image sensor is the key component that determines the basis of the overall image quality. Among the various sensors, CCD sensors and CMOS sensors are the most widely used ones, and the percentage of CMOS sensors is growing.

Although CMOS sensors consume less power and have other advantages over CCD sensors, they suffer several disadvantages as well. One of the disadvantages is that the gain of Gb cells differs from that of Gr cells. This gives rise to so-called Gr-Gb gain imbalance.

Gr-Gb gain imbalance is not only dependent on geometrical location, but also is affected by surrounding R and B cells. Gr-Gb gain imbalance results in different hues of green being rendered given the same input light, which produces image artifacts, namely false textures. Therefore, this gain imbalance needs to be removed.

The straightforward way to remove Gr-Gb imbalance is to average green cells with the surrounding four other green cells. This is equivalent to low-pass filtering the green checkerboard. This removes Gr-Gb imbalance very well, but it also loses edge sharpness.

Another way to remove Gr-Gb imbalance is to use CFA interpolation methods that are insensitive to Gr-Gb imbalance. For example, some CFA interpolation methods interpolate RGB colors at the position in between Gb and Gr cells. This way the resulting green value is close to the average of Gb and Gr. This method removes all or a large part of Gr-Gb imbalance. The problem with this method is that it is not compatible with many CFA interpolation methods which interpolate RGB colors at the center of each cell. There are other CFA interpolation methods which are insensitive to Gr-Gb gain imbalance; however, use of these methods narrows the choice of CFA interpolation methods. This limits its application areas to certain ranges. Also, in some methods the sharpness of edges in images is reduced.

SUMMARY OF THE INVENTION

To address the above-discussed deficiencies of the prior art, one aspect of the invention provides a proximity-based system for reducing Gr-Gb gain imbalance. In one embodiment, the system includes: (1) a sensor configured to provide a input Bayer pattern array containing amplitudes corresponding to Gr and Gb cells and (2) a processor coupled to the sensor and configured to (2a) compute for at least some of the Gr and Gb cells: closeness measures for pluralities of adjacent, same-type cells, weights for pluralities of adjacent, opposite-type cells based on the closeness measures and weighted averages of the pluralities of the adjacent, opposite-type cells based on the weights and (2b) use the weighted averages to form an output Bayer pattern in which the Gr-Gb gain imbalance is reduced.

Another aspect of the invention provides a proximity-based method of reducing Gr-Gb gain imbalance. In one embodiment, the method includes: (1) providing a input Bayer pattern array containing amplitudes corresponding to Gr and Gb cells, (2) computing for at least some of the Gr and Gb cells: (2a) closeness measures for pluralities of adjacent, same-type cells, (2b) weights for pluralities of adjacent, opposite-type cells based on the closeness measures and (2c) weighted averages of the pluralities of the adjacent, opposite-type cells based on the weights; and (3) using the weighted averages to form an output Bayer pattern in which the Gr-Gb gain imbalance is reduced.

Another aspect of the invention provides a digital camera capable of carrying out front-end image processing. In one embodiment, the digital camera includes: (1) a sensor configured to provide a input Bayer pattern array containing amplitudes corresponding to Gr and Gb cells and (2) a processor coupled to the sensor and configured to (2a) compute for at least some of the Gr and Gb cells: closeness measures for four adjacent, same-type cells, weights for four adjacent, opposite-type cells based on the closeness measures and weighted averages of the four adjacent, opposite-type cells based on the weights and (2b) use the weighted averages to form an output Bayer pattern in which the Gr-Gb gain imbalance is reduced.

BRIEF DESCRIPTION OF THE DRAWINGS

For a more complete understanding of the invention, reference is now made to the following descriptions taken in conjunction with the accompanying drawings, in which.

DETAILED DESCRIPTION

1. Overview

In certain embodiments to be described, a center Gb cell is averaged with the ones of the four adjacent Gr cells which are likely on the same side of any nearby edge with edge detection determined from the four adjacent Gb cells. A center Gr cell has the analogous averaging with ones of its adjacent Gb cells.

Figure 1:
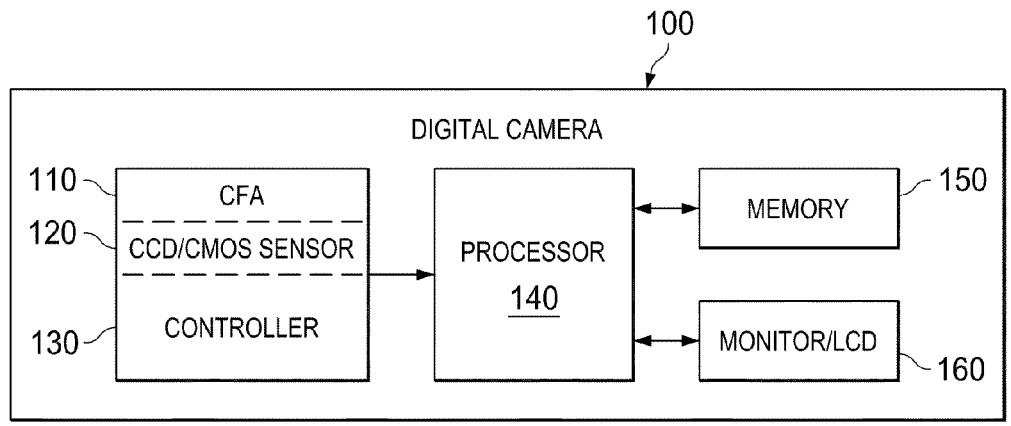
FIG. 1 is a high-level block diagram of a digital camera within which an activity-based system and method for reducing Gr-Gb gain imbalance may be carried out.

Before describing various embodiments of the system and method, various aspects of a digital camera will be described. FIG. 1 is a high level block diagram of one embodiment of a digital camera having a motion sensor and forming an environment within which an activity-based system and method for reducing Gr-Gb gain imbalance may be carried out. Among other things, the camera, generally designated 100, contains a CFA 110 that covers a CCD or CMOS image sensor 120. A controller 130 controls the CCD/CMOS image sensor 120, causing image data to be delivered to a processor 140. The image data may be stored in a memory 150 coupled to the processor 140. The image data may also be displayed on a monitor or liquid crystal display (LCD) 160 coupled to the processor 140.

For purposes of the invention, "processor" is a broad term encompassing not only general-purpose processors such as microprocessors, coprocessors, DSPs and controllers, but also programmable logic arrays (PALs) and special-purpose digital hardware capable of carrying out one or more of the methods described herein.

Figure 2:
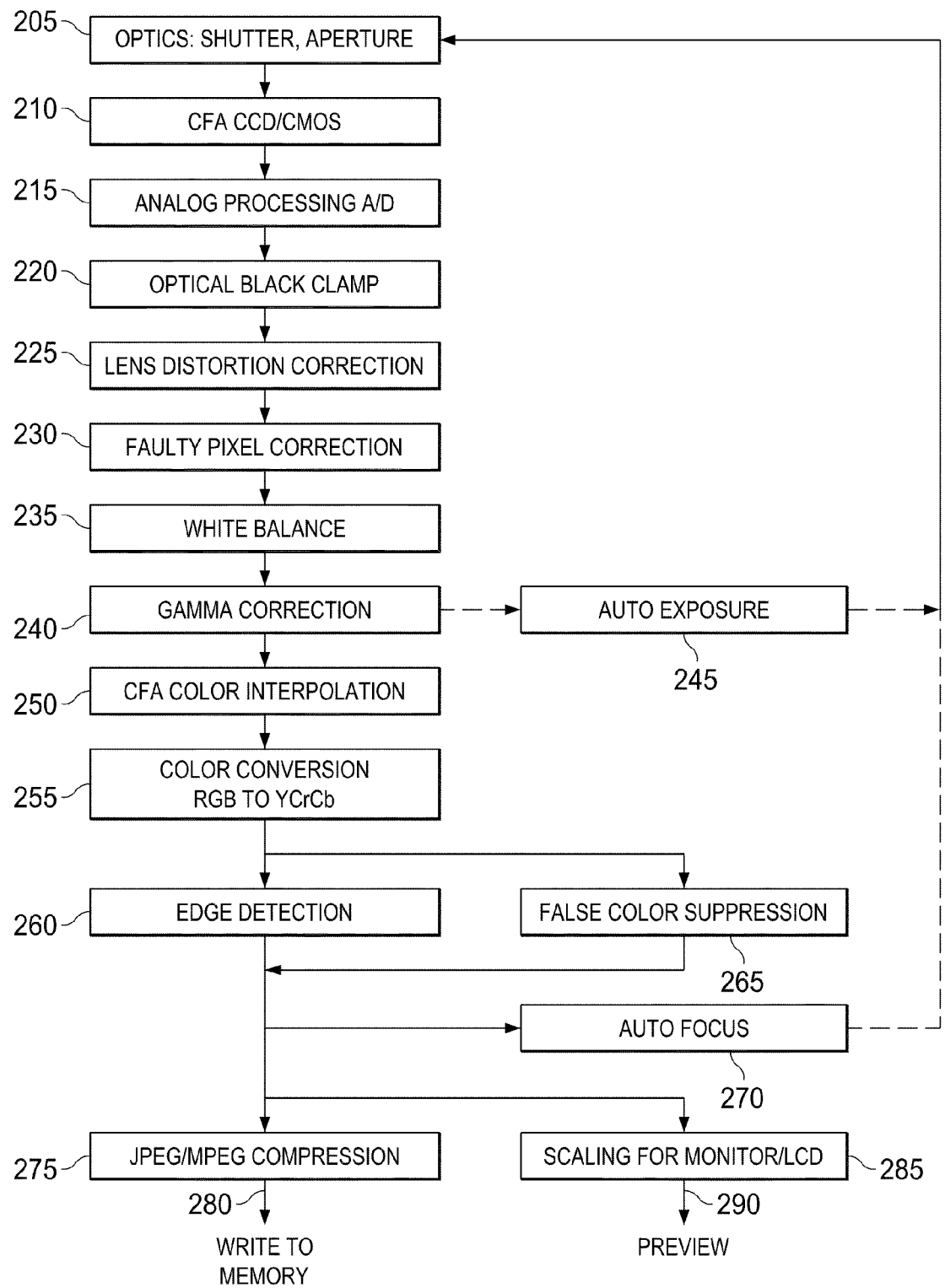
FIG. 2 is a block diagram illustrating prior-art front-end image processing as carried out by one embodiment of the digital camera of FIG. 1.

FIG. 2 is a block diagram illustrating prior-art front-end image processing as carried out by one embodiment of the digital camera 100. An optical system 205 includes a lens, a shutter and an aperture. A CCD 210 receives an image through the optical system 205. An A/D converter 215 converts the analog output of the CCD 210 to a digital image. An optical black clamp 220 removes residual offsets in the digital image. A lens distortion corrector 225 removes known lens distortion from the digital image. A faulty pixel corrector 230 fills in known faulty pixels in the digital image. A white balancer 235 color-corrects the digital image to adjust the color temperature of the digital image. A gamma corrector 240 adjusts gamma (which relates luminance to pixel level) of the digital image. The resulting digital image is then processed by an auto exposure unit 245 that controls the shutter of the optical system 205. The digital image is also provided to a CFA unit 250, which performs color interpolation on the digital image.

A color converter 255 converts the digital image from one color space (e.g., RGB) to another (e.g., YCbCr). An edge detector 260 and a false color corrector 265 respectively detects edges and corrects for false colors in the digital image. The output of the edge detector 260 and the false color corrector 265 is provided to an autofocus (AF) unit 270 that controls the lens of the optical system 205. The output of the edge detector 260 and the false color corrector 265 is provided to a JPEG/MPEG compression unit 275 for conversion into the appropriate one of those well-known still image and video compression standards. The compressed output 280 can then be written to external memory (e.g., synchronous dynamic random-access memory, or SDRAM). The output of the edge detector 260 and the false color corrector 265 is also provided to a scaling unit 285 to scale the digital image to preview 290 on a monitor, such as a liquid crystal display (LCD) on the back of the digital camera.

Figure 3:
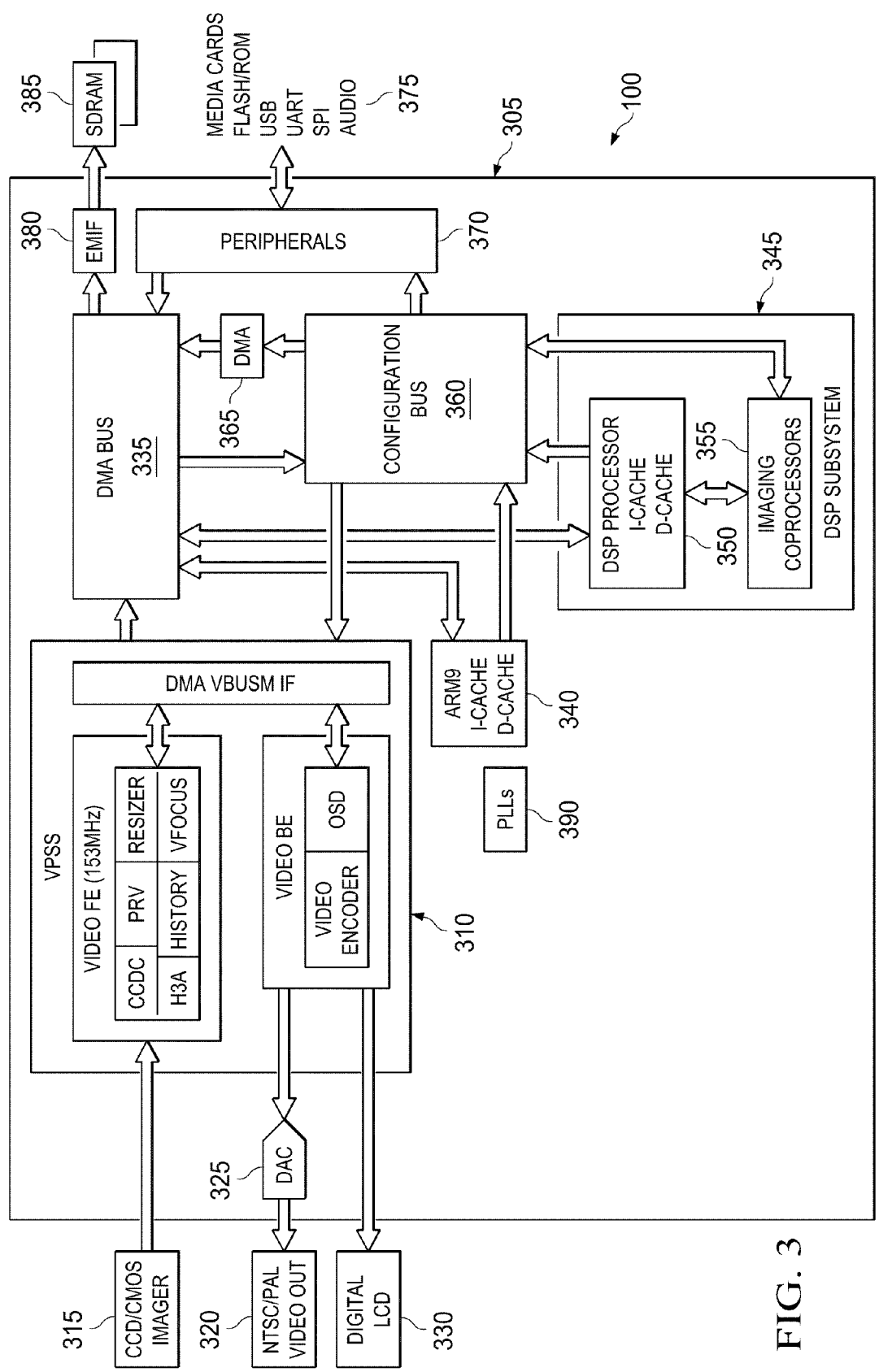
FIG. 3 is a block diagram illustrating one embodiment of circuitry contained in the digital camera of FIG. 1.

FIG. 3 is a block diagram illustrating one embodiment of circuitry contained in the digital camera 100 of FIG. 1. The digital camera contains image processing circuitry 305. The image processing circuitry 305 contains a video processing subsystem (VPSS) 310 that receives images from a CCD/CMOS image sensor 315 and performs much if not all of the front-end image processing detailed in FIG. 2. The VPSS 310 provides output to a National Television System Committee (NTSC) or Phase Alternating Line (PAL) video output 320, whichever is appropriate, via digital-to-analog converter 325, a digital LCD 330 (typically the LCD on the back of the digital camera 100) and a direct memory access (DMA) bus 335.

The DMA bus conveys data among a processor (e.g., a commercially available ARM9) with its associated instruction and data caches 340, a DSP subsystem 345 (containing a DSP with its associated instruction and data caches 350 and imaging processors 355), a configuration bus 360, a DMA controller 365, various peripheral interfaces 370 and an external memory interface (EMIF) 380. The peripheral interfaces 370 may lead to one or more peripheral devices 375, such as media cards, flash, read-only memory (ROM), a universal serial bus (USB), etc. The EMIF 380 provides an interface to external memory, such as SDRAM 385. Various phase-locked loops (PLLs) 390 provide clock signals to synchronize the operation of the aforementioned circuitry.

Figure 4:
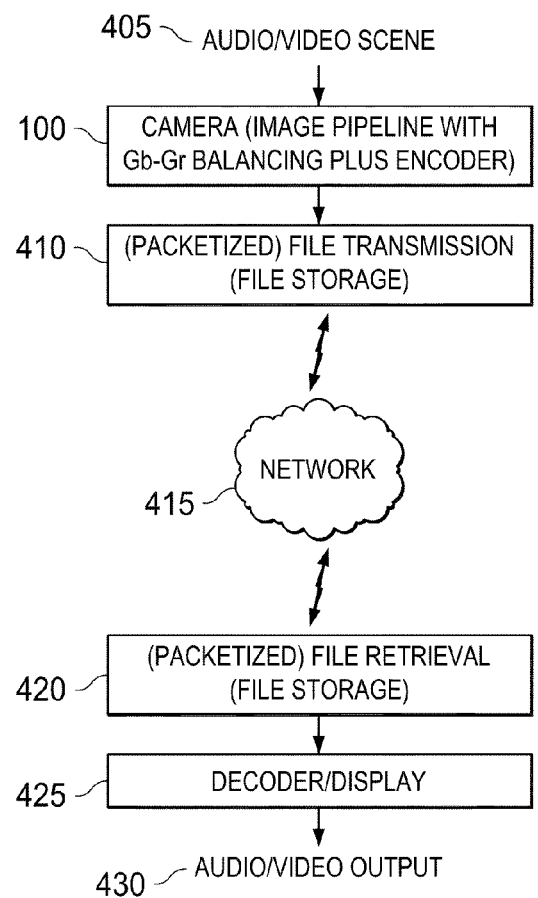
FIG. 4 is a block diagram illustrating one embodiment of network communication carried out by the digital camera of FIG. 1.

FIG. 4 is a block diagram illustrating one embodiment of network communication carried out by the digital camera of FIG. 1. The digital camera 100 captures an audio-visual scene 405 and creates one or more digital still or video images, perhaps including audio. The digital camera 100 may thereafter divide the digital images into packets and create a transmission 410 to a network 415 to cause them to be stored as one or more files (not shown). The one or more files may thereafter be retrieved, whereupon they are again divided into packets and a transmission 420 created. The retrieved digital images 420 may then be passed through a decoder 425 and displayed as an audio/video output 430.

Having described various aspects of a digital camera and its potential interaction with a network, various embodiments of the system and method will now be described.

Figure 5:
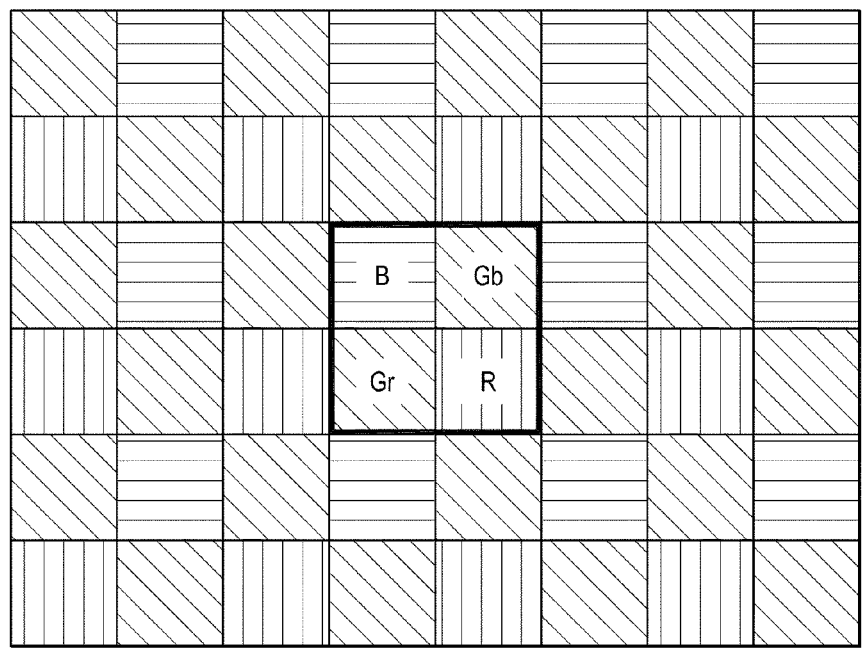
FIG. 5 is a diagram schematically illustrating a CFA containing a Bayer pattern.

FIG. 5 is a diagram schematically illustrating a CFA containing a Bayer pattern. The CFA is a Cartesian array of red, green and blue cells. Because the CFA is a color array and FIG. 5 is rendered in black-and-white, crosshatching conforming to ¶608.02 of the U.S. Patent and Trademark Office's Manual of Patent Examining Procedure has been used to designate colors. Specifically, vertical crosshatching designates red cells, upper-left-pointing diagonal crosshatching designates green cells, and horizontal crosshatching designates blue cells. A representative unit Bayer pattern is outlined in black line in the center of the CFA and consists of one red cell R, two green cells Gr, Gb and one blue cell B.

Figure 6A:
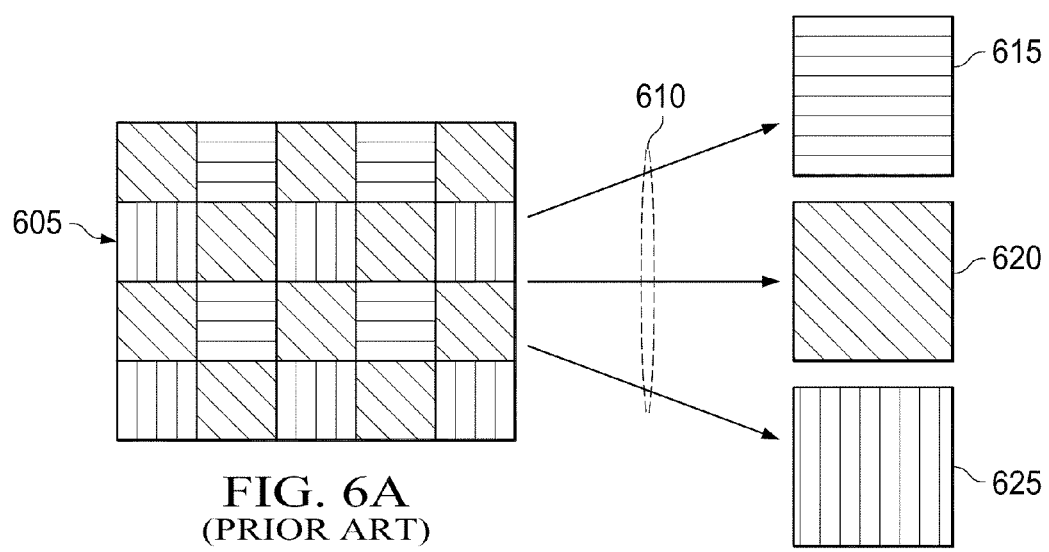
FIGS. 6A and 6B are diagrams schematically illustrating a prior art technique of CFA interpolation and the consequences that result from a Gr-Gb imbalance in the Bayer pattern of FIG. 5.
Figure 6B:
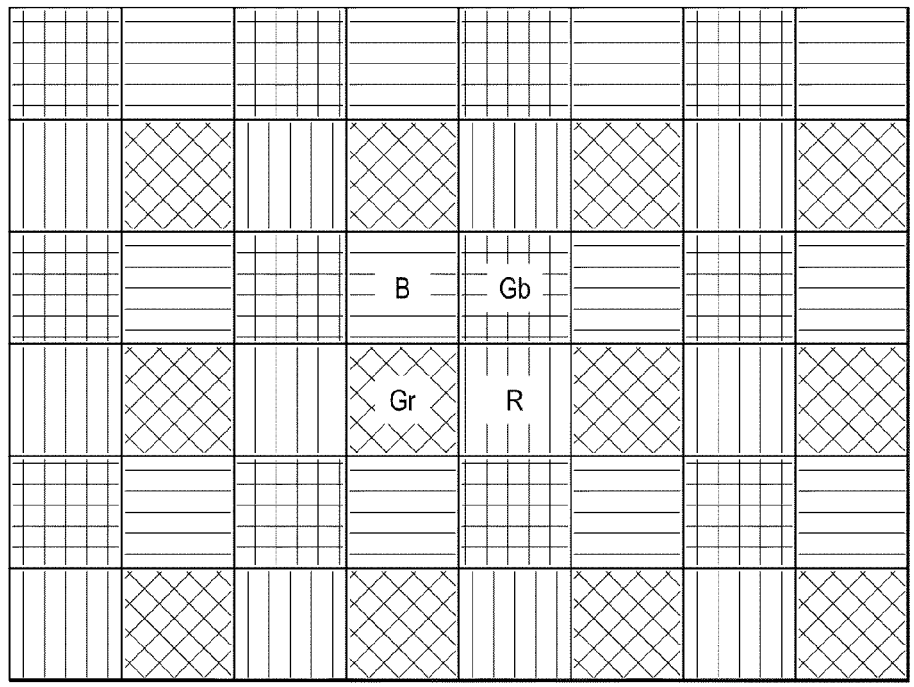

FIGS. 6A and 6B are diagrams schematically illustrating a prior art technique of CFA interpolation and the consequences that result from a Gr-Gb imbalance in the Bayer pattern of FIG. 5. As those skilled in the art are familiar, a Bayer pattern array 605 is provided to a CFA interpolation process 610, resulting in three full-color arrays: a blue array 615, a green array 620 and a red array 625. Unfortunately, the green array 620 contains artifacts resulting from the presence of gain-imbalanced Gr and Gb. FIG. 6B represents this gain imbalance in that the crosshatching of Gr cells differs from the crosshatching of Gb cells.

Figure 7:
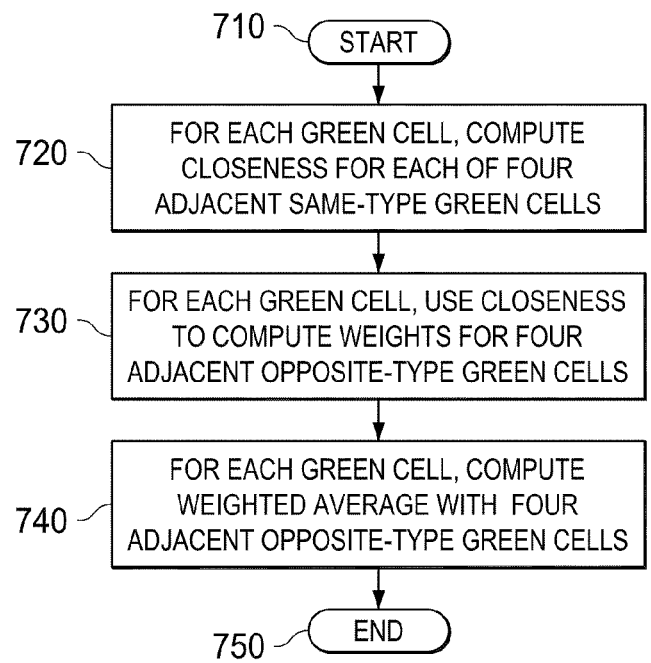
FIG. 7 is a flowchart of one embodiment of a proximity-based method of reducing Gr-Gb gain imbalance.

FIG. 7 is a flowchart of one embodiment of a proximity-based method of reducing Gr-Gb gain imbalance. The method begins in a start step 710, in which a Bayer pattern array is provided. For each green cell in the Bayer pattern array, a closeness for each of, e.g., four adjacent green cells of the same Gr-Gb type is computed in a step 720. Then, for each green cell, the closeness is used to compute weights for each of four adjacent green cells of the opposite Gr-Gb type in a step 730. Then, for each green cell, a weighted average with four adjacent green cells of the opposite Gr-Gb type is computed in a step 740. The resulting Gr-Gb balanced Bayer pattern array is provided in an end step 750.

With reference back to FIG. 2, the method of FIG. 7 may be applied between the gamma corrector 240 and the CFA unit 250, or between the white balancer 235 and the gamma corrector 240, may be merged with the white balance 235 or any other suitable location in front-end image processing.

Figure 8:
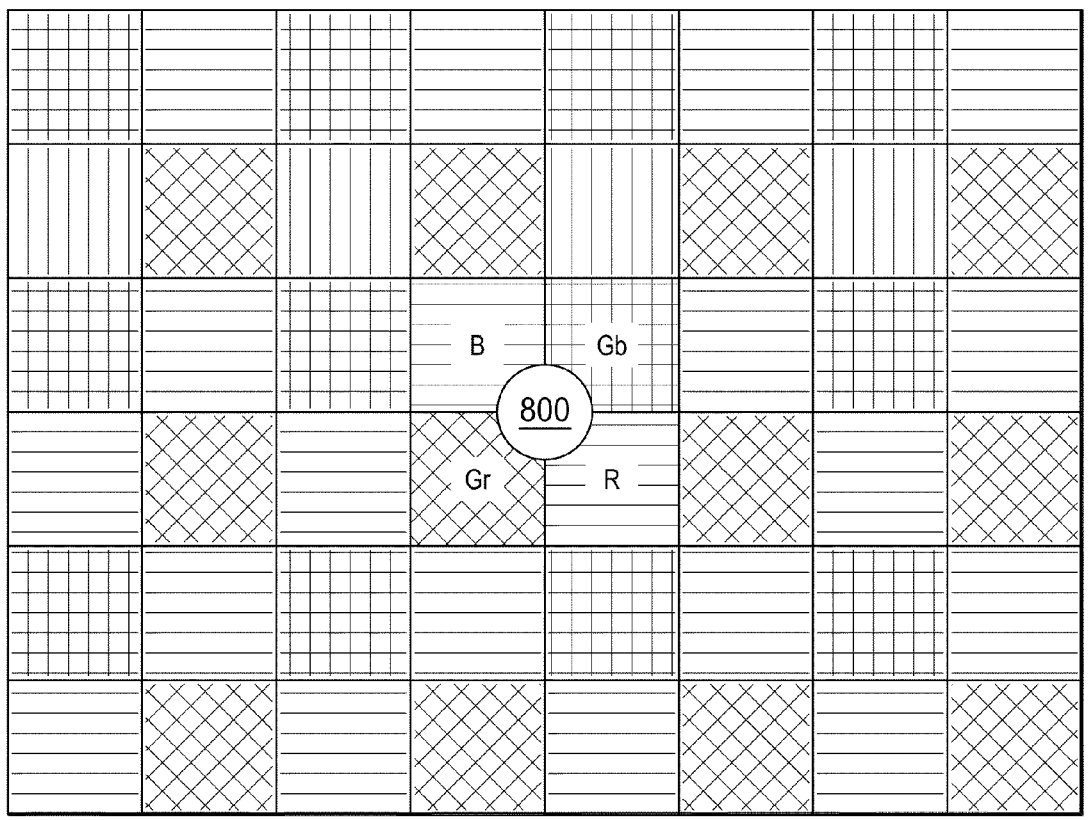
FIG. 8 is a diagram schematically illustrating a CFA containing a Bayer pattern and a high-level representation of proximity-based Gr-Gb gain imbalance reduction.

FIG. 8 is a diagram schematically illustrating a CFA containing a Bayer pattern and a high-level representation of proximity-based Gr-Gb gain imbalance reduction 800. FIG. 8 shows that the gain imbalance reduction 800 occurs among Gr and Gb in multiple rows and columns of cells. Having described various general embodiments of methods of gain imbalance reduction, certain specific embodiments will now be described.

2. Specific Embodiments

Figure 9:
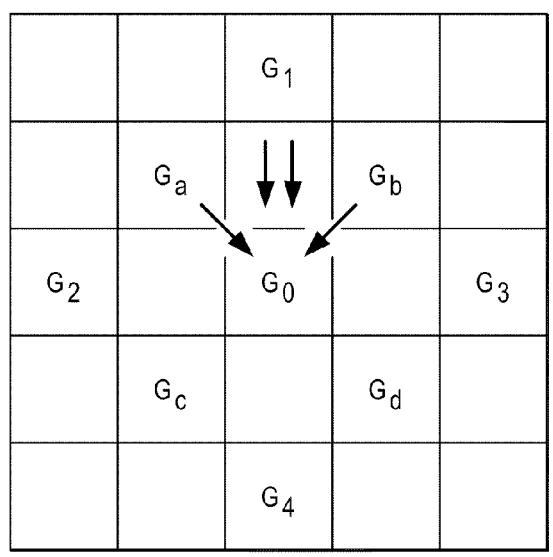
FIG. 9 is a diagram schematically illustrating cell identities and proximity-based interpretation.

FIG. 9 is a diagram schematically illustrating cell identities and proximity-based interpretation. A first specific embodiment of mitigating Gr-Gb imbalance effectively average with only the green cells in a neighborhood that are similar to the center green cell. Of the surrounding (e.g., four) green cells, only those which are expected to be close in amplitude to the center cell are chosen, and they are averaged with the center cell to make the final output for the center. In this way, edges are well preserved to maintain image sharpness while most of the Gr-Gb imbalance is removed.

Preliminarily, the notation used is shown FIG. 9 which illustrates a 5×5 cell neighborhood in Bayer pattern with the green cells labeled. The center green cell amplitude is $G_0$, and the surrounding four closest green cells have amplitudes $G_a$, $G_b$, $G_c$, and $G_d$. The next nearest four green cells have amplitudes $G_1$, $G_2$, $G_3$ and $G_4$. The $G_0$–$G_4$ cells are of same green type (either all Gb or all Gr), whereas $G_a$–$G_d$ are of the opposite green type (if $G_0$ is Gr, then $G_a$–$G_d$ are Gb; and if $G_0$ is Gb, then $G_a$–$G_d$ are Gr). The output value $G_{out}$ for the center green cell (with input amplitude $G_0$) is derived from the weighted average of $G_a$, $G_b$, $G_c$, $G_d$ and $G_0$. The weights are derived from $G_1$, $G_2$, $G_3$ and $G_4$. FIG. 9 indicates the approach: when $G_1$ is close to $G_0$ (i.e., on the same side of any local edge), then $G_a$ and $G_b$ are likely also to be close to $G_0$ and, therefore, $G_a$ and $G_b$ will be averaged with $G_0$; whereas, when $G_1$ is very different from $G_0$ (i.e., on opposite sides of a local edge), then $G_a$ and $G_b$ will not be used in the averaging. An analogous analysis is applied for each of $G_2$, $G_3$ and $G_4$. More explicitly, the methods include the following three steps.

First Step

The absolute value of the difference between $G_0$ and $G_1$ is calculated.

$$D_1 = |G_0 - G_1|.$$

If $D_1$ is small, $G_0$ and $G_1$ are considered close, and the chance that $G_a$ and $G_b$ are close to $G_0$ is high. So, $G_a$ and $G_b$ will have large contributions to the final output.

In a similar way, $D_2$, $D_3$ and $D_4$ are calculated.

$$D_2 = |G_0 - G_2|.$$

$$D_3 = |G_0 - G_3|.$$

$$D_4 = |G_0 - G_4|.$$

Second Step

Weights are calculated according to these difference values in the following manner; if a difference is small, the weight is large; whereas, if a difference is large, the weight is small or zero. Such weights are realized through a monotonically decreasing function f(x), which satisfies f(0)=1 and f(∞)=0. Explicitly, the weight coefficients are calculated as follows.

$$w_a = (f(D_1) + f(D_2))/8$$

$$w_b = (f(D_1) + f(D_3))/8$$

$$w_c = (f(D_2) + f(D_4))/8$$

$$w_d = (f(D_3) + f(D_4))/8$$

Figure 10A:
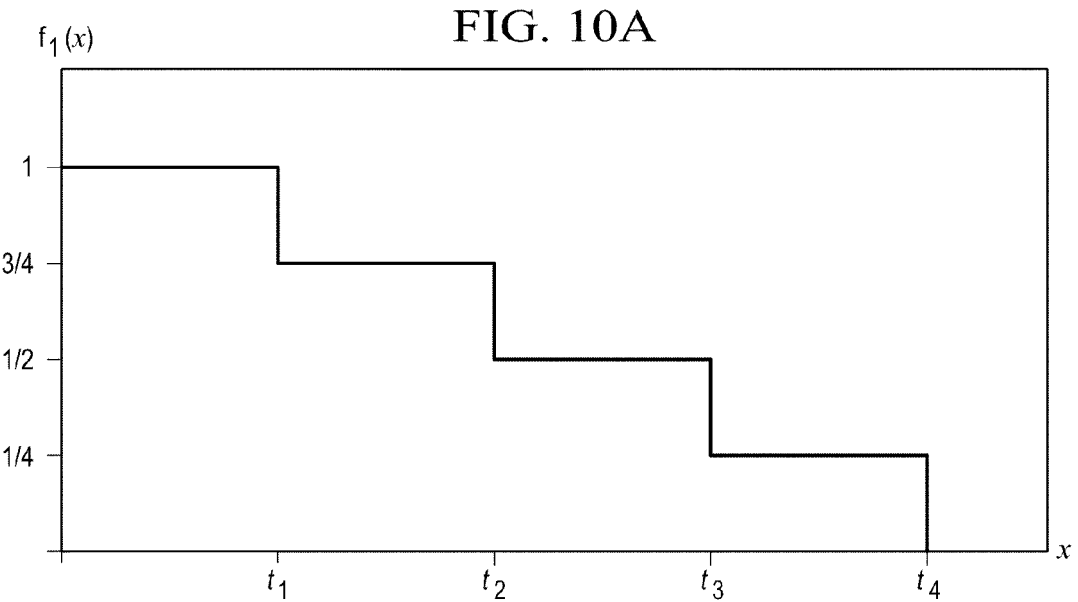
FIGS. 10A and 10B are graphs of monotonic functions that certain embodiments of proximity-based methods may employ for interpolation.
Figure 10B:
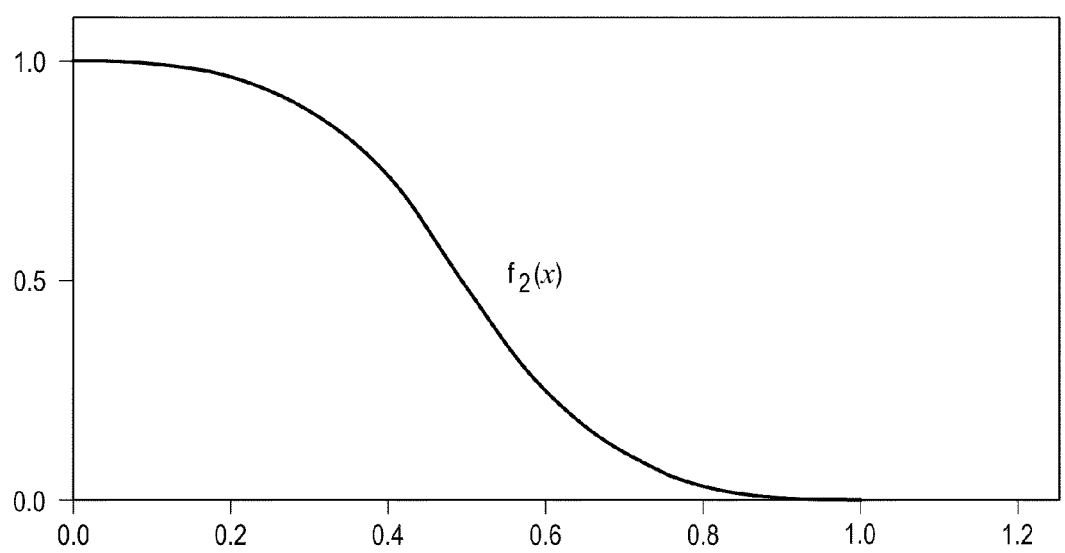

FIGS. 10A and 10B are graphs of monotonic functions that certain embodiments of proximity-based methods may employ for interpolation.

$$f_1(x) = \begin{cases} 1 & x < t_1 \\ 3/4 & t_1 \le x < t_2 \\ 1/2 & t_2 \le x < t_3 \\ 1/4 & t_3 \le x < t_4 \\ 0 & t_4 \le x \end{cases} \quad \text{Example 1}$$

FIG. 10A is a graph of $f_1(x)$. $f_1(x)$ is simple and may easily be implemented in hardware. Despite its simplicity, this function works well for most images. For 12-bit data (amplitudes $G_0$, $G_1$, $G_2$, $G_3$, $G_4$, $G_a$, $G_b$, $G_c$, and $G_d$ all in the range 0 to 4095), typical threshold values would be $t_1=128$, $t_2=256$, $t_3=384$, and $t_4=512$.

$$f_2(x) = \begin{cases} g(|x|/t) & |x| < t/2 \\ 1 - g(1-|x|/t) & t/2 \le |x| \text{ and } |x| < t \\ 0 & t \le |x| \end{cases} \quad \text{Example 2}$$

where $g(x)$ has a form such as $1-4(x)^3$. FIG. 11B is a graph of $f_2(x)$; and for 12-bit data, a typical threshold value would be $t=512$.

Besides these two examples, any monotonically decreasing function with $f(0)=1$ and $f(\infty)=0$ may be used.

Third Step

The tentative output green cell amplitude, $G_0'$, is calculated as the following weighted average.

$$G_0' = (1-w_a-w_b-w_c-w_d)G_0 + w_a G_a + w_b G_b + w_c G_c + w_d G_d$$

Then, this tentative output is mixed with the original center cell to make the final output.

$$G_{out} = (1-\lambda)G_0 + \lambda G_0'$$

Here, $\lambda$ is a tuning parameter between 0 and 1; a typical value is $\lambda=\frac{1}{2}$. Of course, this is the same as:

$$G_{out} = (1-\lambda w_a - \lambda w_b - \lambda w_c - \lambda w_d)G_0 + \lambda w_a G_a + \lambda w_b G_b + \lambda w_c G_c + \lambda w_d G_d$$

The final value $G_{out}$ replaces the original Go value of the input Bayer pattern. After all green cells are processed in this manner, the Gr-Gb balanced Bayer pattern is sent to the rest of the image processing stages to make the final full color output (e.g., by CFA interpolation).

3. Experimental Results

Figure 11A:
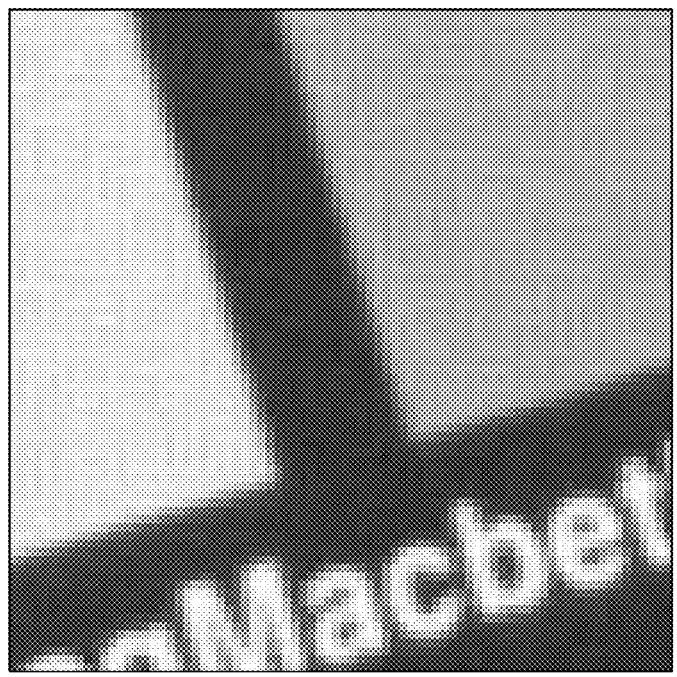
FIGS. 11A and 11B are photographs illustrating experimental results regarding application of the method of FIG. 7.
Figure 11B:

FIGS. 11A and 11B are pictures illustrating experimental results regarding application of the method of FIG. 7. For the experiment, a Bayer pattern image with 3% Gr-Gb imbalance was used; that imbalance was artificially introduced to an original image by using external software. The original image data was acquired from a CCD sensor with very small Gr-Gb imbalance. Since this experiment focused on removal of Gr-Gb imbalance, this test data sufficed for the purpose.

The test image with 3% Gr-Gb imbalance was processed with the method of FIG. 7 to remove the imbalance. Then its output data was processed with CFA interpolation and other necessary processes (white balance and gamma correction). In the Gr-Gb correction process, the function $f_1(x)$ of Example 1, above, was used.

FIGS. 11A and 11B compare the output image with the original image without Gr-Gb correction. FIG. 11A shows part of the original image without Gr-Gb correction. FIG. 11B shows the same part of the image with preferred embodiment Gr-Gb correction. In the case of FIG. 11A, a Gr-Gb imbalance creates an undesirable artifact; whereas, in FIG. 11B, this texture is well removed. Also, details and edge sharpness in FIG. 11B are well preserved.

These experimental results indicate that the preferred embodiment methods are effective in removal of Gr-Gb imbalance without spoiling image sharpness.

4. Modifications

The embodiments described above may be modified in various ways while retaining the feature of an edge-adaptive averaging to reduce Gr-Gb imbalance. For example, the size of the area for averaging could be increased from 3×3 to 7×7 or larger, and the closeness ($D_j$) could be changed to a general edge detection. Those skilled in the pertinent art will readily perceive other modifications that may be made to the various embodiments described herein that may find advantage in certain applications.

Those skilled in the art to which the invention relates will appreciate that other and further additions, deletions, substitutions and modifications may be made to the described embodiments without departing from the scope of the invention.

What is claimed is:

1. A proximity-based system for reducing Gr-Gb gain imbalance, comprising:

a sensor configured to provide an input Bayer pattern array containing amplitudes corresponding to Gr and Gb cells; and a processor coupled to said sensor and configured to compute for at least some of said Gr and Gb cells:

closeness measures for pluralities of adjacent, same-type cells, weights for pluralities of adjacent, opposite-type cells based on said closeness measures wherein a monotonically decreasing function determines said weights, and weighted averages of said pluralities of said adjacent, opposite-type cells based on said weights and use said weighted averages to form an output Bayer pattern in which said Gr-Gb gain imbalance is reduced.

2. The system as recited in claim 1 wherein said pluralities of adjacent, same-type cells consist of four adjacent, same-type cells and said pluralities of adjacent, opposite-type cells consist of four adjacent, opposite-type cells.

3. The system as recited in claim 1 wherein said monotonically decreasing function is a step function.

4. The system as recited in claim 3 wherein said monotonically decreasing function, $f_1(x)$, is:

$$f_1(x) = \begin{cases} 1 & x < t_1 \\ 3/4 & t_1 \le x < t_2 \\ 1/2 & t_2 \le x < t_3 \\ 1/4 & t_3 \le x < t_4 \\ 0 & t_4 \le x \end{cases}$$

wherein $t_1$, $t_2$, $t_3$, and $t_4$ are thresholds.

5. The system as recited in claim 1 wherein said monotonically decreasing function, $f_2(x)$, is:

$$f_2(x) = \begin{cases} g(|x|/t) & |x| < t/2 \\ 1 - g(1-|x|/t) & t/2 \le |x| \text{ and } |x| < t \\ 0 & t \le |x| \end{cases}$$

wherein g( ) is an amplitude and t is threshold.

6. The system as recited in claim 1 wherein said processor employs said output Bayer pattern to perform a color filter array interpolation.

7. A proximity-based method of reducing Gr-Gb gain imbalance, comprising:
providing an input Bayer pattern array containing amplitudes corresponding to Gr and Gb cells;
computing for at least some of said Gr and Gb cells:
closeness measures for pluralities of adjacent, same-type cells,
weights for pluralities of adjacent, opposite-type cells based on said closeness measures wherein a monotonically decreasing function determines said weights, and
weighted averages of said pluralities of said adjacent, opposite-type cells based on said weights; and
using said weighted averages to form an output Bayer pattern in which said Gr-Gb gain imbalance is reduced.

8. The method as recited in claim 7 wherein said pluralities of adjacent, same-type cells consist of four adjacent, same-type cells and said pluralities of adjacent, opposite-type cells consist of four adjacent, opposite-type cells.

9. The method as recited in claim 7 wherein said monotonically decreasing function is a step function.

10. The method as recited in claim 9 wherein said monotonically decreasing function, $f_1(x)$, is:

$$f_1(x) = \begin{cases} 1 & x < t_1 \\ 3/4 & t_1 \le x < t_2 \\ 1/2 & t_2 \le x < t_3 \\ 1/4 & t_3 \le x < t_4 \\ 0 & t_4 \le x \end{cases}$$

wherein $t_1$, $t_2$, $t_3$, and $t_4$ are thresholds.

11. The method as recited in claim 7 wherein said monotonically decreasing function, $f_2(x)$, is:

$$f_2(x) = \begin{cases} g(|x|/t) & |x| < t/2 \\ 1 - g(1-|x|/t) & t/2 \le |x| \text{ and } |x| < t \\ 0 & t \le |x| \end{cases}$$

wherein g( ) is an amplitude and t is threshold.

12. The method as recited in claim 7 further comprising employing said output Bayer pattern to perform a color filter array interpolation.

13. A digital camera capable of carrying out front-end image processing and comprising:
a sensor configured to provide an input Bayer pattern array containing amplitudes corresponding to Gr and Gb cells; and
a processor coupled to said sensor and configured to compute for at least some of said Gr and Gb cells:
closeness measures for four adjacent, same-type cells,
weights for four adjacent, opposite-type cells based on said closeness measures wherein a monotonically decreasing function determines said weights, and
weighted averages of said four adjacent, opposite-type cells based on said weights and
use said weighted averages to form an output Bayer pattern in which said Gr-Gb gain imbalance is reduced.

14. The digital camera as recited in claim 13 wherein said monotonically decreasing function is a step function.

15. The digital camera as recited in claim 13 wherein said processor employs said output Bayer pattern to perform a color filter array interpolation.

16. A method of Bayer pattern Gr-Gb imbalance reduction, comprising the steps of:
(a) providing an input Bayer pattern array of cell amplitudes with first, second, third, ..., Nth green cells where N is a positive integer;
(b) for said first green cell of said input Bayer pattern array, computing a closeness measure for each of the four adjacent green cells of the same Gr-Gb type as said first green cell;
(c) for said first green cell using said closeness measures, computing weights for each of four adjacent green cells of the opposite Gr-Gb type as said first green cell;
(d) for said first green cell using said weights, computing a weighted average with said four adjacent green cells of the opposite Gr-Gb type as said first green cell;
(e) for each of said second, third, ..., Nth green cells, repeating said steps of computing a closeness measure, computing weights, and computing a weighted average; and
(f) using said weighted averages for said first, second, third, ..., Nth green cells to form a Gr-Gb balanced Bayer pattern.

17. A digital camera, comprising:
(i) a sensor with Bayer pattern output;
(ii) an image pipeline coupled to said sensor; and
(iii) a Bayer pattern Gr-Gb balancer coupled to said image pipeline, said Bayer pattern Gr-Gb balancer operable to:
(a) for a first green cell of a Bayer pattern array of cell amplitudes with first, second, third, ..., Nth green cells where N is a positive integer, compute a closeness measure for each of the four adjacent green cells of the same Gr-Gb type as said first green cell;
(b) for said first green cell using said closeness measures, compute weights for each of four adjacent green cells of the opposite Gr-Gb type as said first green cell;
(c) for said first green cell using said weights, compute a weighted average with said four adjacent green cells of the opposite Gr-Gb type as said first green cell;
(d) for each of said second, third, ..., Nth green cells, repeat said steps of compute a closeness measure, compute weights, and compute a weighted average; and
(e) using said weighted averages for said first, second, third, ..., Nth green cells, form a Gr-Gb balanced Bayer pattern.

* * * * *